United States Patent
Scaggs et al.

(10) Patent No.: US 12,545,397 B2
(45) Date of Patent: Feb. 10, 2026

(54) HEAT SHIELD RETAINING CLASP

(71) Applicant: Goodrich Corporation, Charlotte, NC (US)

(72) Inventors: Nicholas Edward Scaggs, Springfield, OH (US); Nathaniel J. Herrmann, Springfield, OH (US); William G. Thorn, Winchester, IN (US)

(73) Assignee: GOODRICH CORPORATION, Charlotte, NC (US)

( * ) Notice: Subject to any disclaimer, the term of this patent is extended or adjusted under 35 U.S.C. 154(b) by 808 days.

(21) Appl. No.: 17/864,550

(22) Filed: Jul. 14, 2022

(65) Prior Publication Data
US 2024/0017822 A1    Jan. 18, 2024

(51) Int. Cl.
*B64C 25/36* (2006.01)
*F16D 65/02* (2006.01)
*F16D 65/78* (2006.01)

(52) U.S. Cl.
CPC ........ *B64C 25/36* (2013.01); *F16D 2065/138* (2013.01); *F16D 2065/785* (2013.01)

(58) Field of Classification Search
CPC ... B64C 25/36; B64C 25/42; F16D 2065/785; F16D 65/128; F16D 65/847; F16D 55/36; B60C 23/18; B60C 23/19
See application file for complete search history.

(56) References Cited

U.S. PATENT DOCUMENTS

| | | | |
|---|---|---|---|
| 3,051,528 A * | 8/1962 | Rogers | B60C 23/18 188/264 G |
| 5,236,249 A * | 8/1993 | Han | B60C 23/18 301/6.91 |
| 5,851,056 A * | 12/1998 | Hyde | B60B 19/10 188/264 G |
| 8,668,276 B2 | 3/2014 | Hall et al. | |
| 2003/0102710 A1* | 6/2003 | Thorp | F16D 55/36 301/6.1 |

(Continued)

FOREIGN PATENT DOCUMENTS

| EP | 3480072 | 5/2019 |
|---|---|---|
| EP | 3647622 | 5/2020 |

(Continued)

OTHER PUBLICATIONS

European Patent Office, European Search Report dated Dec. 6, 2023 in Application No. 23185624.6.

(Continued)

*Primary Examiner* — S. Joseph Morano
*Assistant Examiner* — Emily G. Castonguay
(74) *Attorney, Agent, or Firm* — SNELL & WILMER L.L.P.

(57) ABSTRACT

A wheel assembly is disclosed herein. The wheel assembly includes a torque bar extending in a first direction, a retainer plate coupled to the torque bar, the retainer plate having a first side formed into a first U-channel, the first U-channel formed in a second direction perpendicular to the first direction, a heat shield panel having a first side formed into a second U-channel, the second U-channel of the heat shield panel being formed in a third direction opposite the second direction, and a retention clasp formed from a portion of the heat shield panel, the retention clasp formed over an open end of the second U-channel.

20 Claims, 7 Drawing Sheets

(56) References Cited

U.S. PATENT DOCUMENTS

| | | | |
|---|---|---|---|
| 2019/0113092 A1* | 4/2019 | French | F16D 65/128 |
| 2020/0130818 A1* | 4/2020 | Leiva | B60B 27/0052 |
| 2020/0189727 A1* | 6/2020 | French | F16D 65/0081 |
| 2020/0278005 A1 | 9/2020 | Moline | |
| 2020/0300320 A1 | 9/2020 | Francis | |
| 2021/0018055 A1* | 1/2021 | Miller | F16D 55/36 |
| 2021/0197633 A1 | 7/2021 | French | |

FOREIGN PATENT DOCUMENTS

| | | |
|---|---|---|
| EP | 3767125 | 1/2021 |
| EP | 3842339 | 6/2021 |

OTHER PUBLICATIONS

European Patent Office, European Office Action dated Nov. 19, 2025 in Application No. 23185624.6.

\* cited by examiner

HEAT SHIELD RETAINING CLASP

FIELD

The present disclosure generally relates to aircraft wheel assemblies, and more specifically, to heat shields used in aircraft wheel assemblies.

BACKGROUND

Various aircraft wheel assemblies include a heat shield surrounding the inner diameter to reduce heat stress on the wheel from the brake. In some wheel assemblies, the heat shield is held in place using a heat shield retainer. Under certain conditions the heat shield retainer may become loose and migrate from its proper position and exit the wheel. This migration may result in increased wheel temperatures caused by operating without the heat shield in the proper location. The missing retainer may become debris on the runaway which may be dangerous to other aircraft.

SUMMARY

A wheel assembly is disclosed herein. The wheel assembly includes a torque bar extending in a first direction, a retainer plate coupled to the torque bar, the retainer plate having a first side formed into a first U-channel, the first U-channel formed in a second direction perpendicular to the first direction, a heat shield panel having a first side formed into a second U-channel, the second U-channel of the heat shield panel being formed in a third direction opposite the second direction, and a retention clasp formed from a portion of the heat shield panel, the retention clasp formed over an open end of the second U-channel.

In various embodiments, the wheel assembly further includes a mushroom feature extending orthogonally from the torque bar in the third direction, the mushroom feature extending through a retention slot formed in the retainer plate. In various embodiments, the retention clasp is secured to the open end of the second U-channel. In various embodiments, a portion of the first U-channel of the retainer plate is interlocked with the second U-channel. In various embodiments, the wheel assembly further includes a fastener configured to prevent the heat shield panel from moving in the first direction.

In various embodiments, the retention clasp is formed adjacent the open end of the second U-channel. In various embodiments, the wheel assembly further includes a second retention clasp formed from the heat shield panel and over a second open end of the second U-channel.

Also disclosed herein is a heat shield assembly including a retainer having a first side, the first side of the retainer having a first seam formed therein, a heat shield panel having a first side, the first side of the heat shield panel having a second seam formed therein, the second seam being complementary the first seam, the heat shield panel being coupled to the retainer by the first seam and the second seam, and a retention clasp formed over an end of the second seam.

In various embodiments, the retention clasp is secured to the end of the second seam. In various embodiments, a portion of the first seam is interlocked with the second seam. In various embodiments, the heat shield assembly further includes a second retention clasp formed over a second end of the second seam, the second end being opposite the end of the second seam. In various embodiments, the retention clasp is integral with the heat shield panel.

In various embodiments, the retainer further includes retention slots formed therein. In various embodiments, the first seam is formed as a U-channel having an open channel along a length of the seam.

Also disclosed herein is a method of manufacturing a heat shield. The method includes receiving a heat shield panel, forming a seam in a first direction along a first side of the heat shield panel, the seam including an opening along a short edge of the seam extending in a second direction that is perpendicular to the first direction, forming a tab adjacent the short edge of the seam, and bending the tab over the opening of the short edge of the seam.

In various embodiments, the method further includes receiving a retainer plate, forming a second seam in a third direction along a first side of the retainer plate, the third direction being opposite the first direction, and coupling the second seam of the retainer plate to the seam of the heat shield panel. In various embodiments, the method further includes forming a retention slot in the retainer plate, receiving a torque bar extending in the second direction, the torque bar including a mushroom feature extending orthogonally from the torque bar in the first direction, and connecting the retainer plate to the torque bar, wherein the mushroom feature extends through the retention slot.

In various embodiments, the method further includes sliding the retainer plate in the second direction, securing the retainer plate to the torque bar. In various embodiments, the tab contacts the second seam of the retainer plate in response to the heat shield panel being coupled to the retainer plate. In various embodiments, the method further includes securing the tab to the short edge of the seam.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein, in accordance with various embodiments, is a retention clasp formed into a heat shield panel to hold a heat shield retainer of a wheel assembly in place. In various embodiments, the heat shield of an aircraft wheel assembly may include multiple heat shield retainers and heat shield panels surrounding a portion of a wheel assembly. For example, the heat shield may include nine retainers and nine panels per wheel. In various embodiments, the heat shield retainer is installed onto a torque bar that is attached to the wheel. In various embodiments, a mushroom feature extends orthogonal to the torque bar and the heat shield retainer slides over the mushroom feature and onto the torque bar. In various embodiments, the heat shield retainer includes a seam having a U-shape. In various embodiments, the heat shield panel includes a seam having a complementary U-shape so that the seam of the heat shield panel slides into the seam of the heat shield retainer. In various embodiments, a retention clasp is formed at an end of the heat shield panel seam. The retention clasp locks the heat shield retainer in place, preventing the heat shield retainer from migrating from its proper position. In various embodiments, the retention clasp is integral to the heat shield panel. In various embodiments, including the retention clasp may reduce the number of parts used to hold the heat shield in place which may also reduce cost and maintenance time.

Figure 1A:
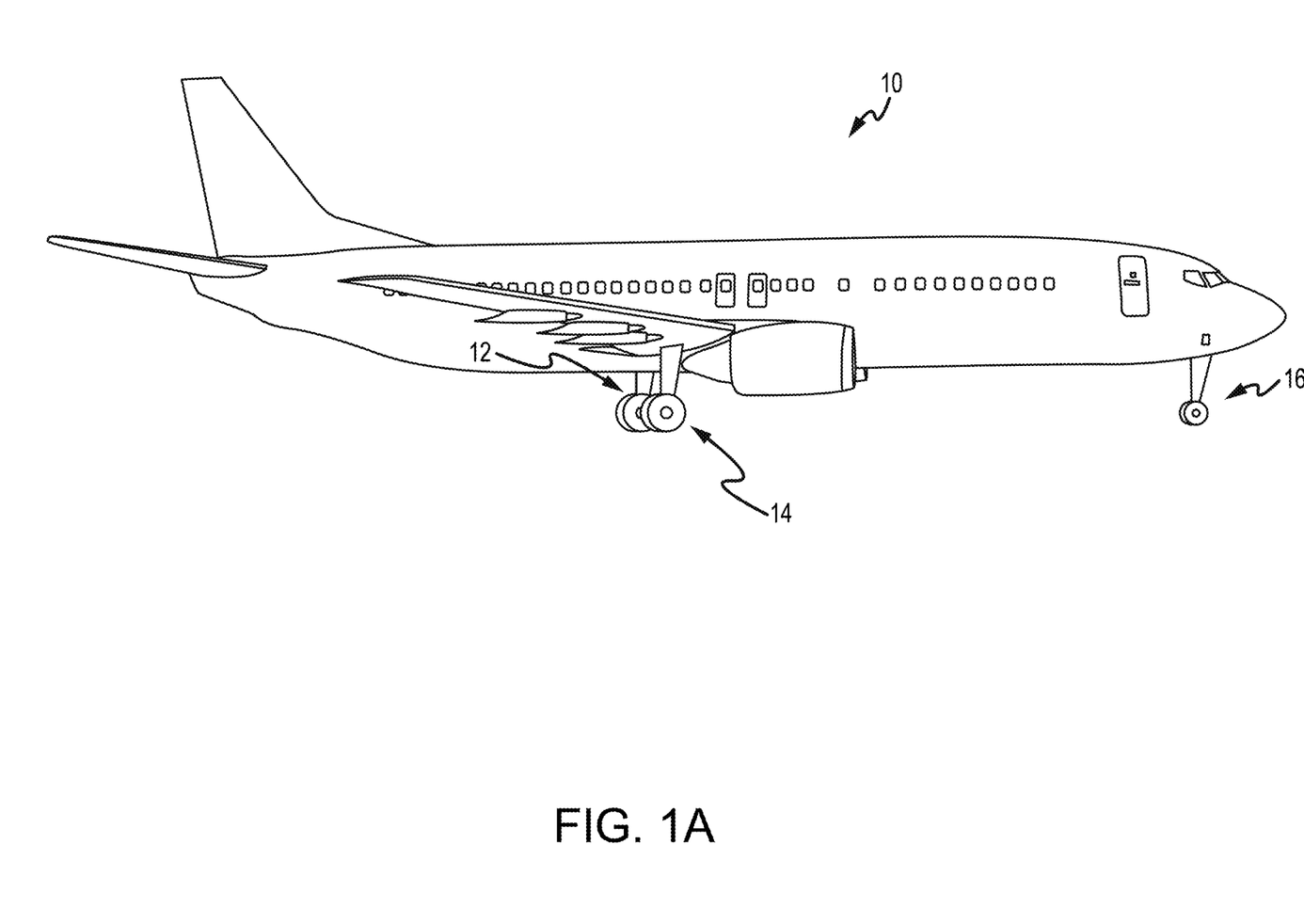
FIG. 1A illustrates an exemplary aircraft having a wheel and brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
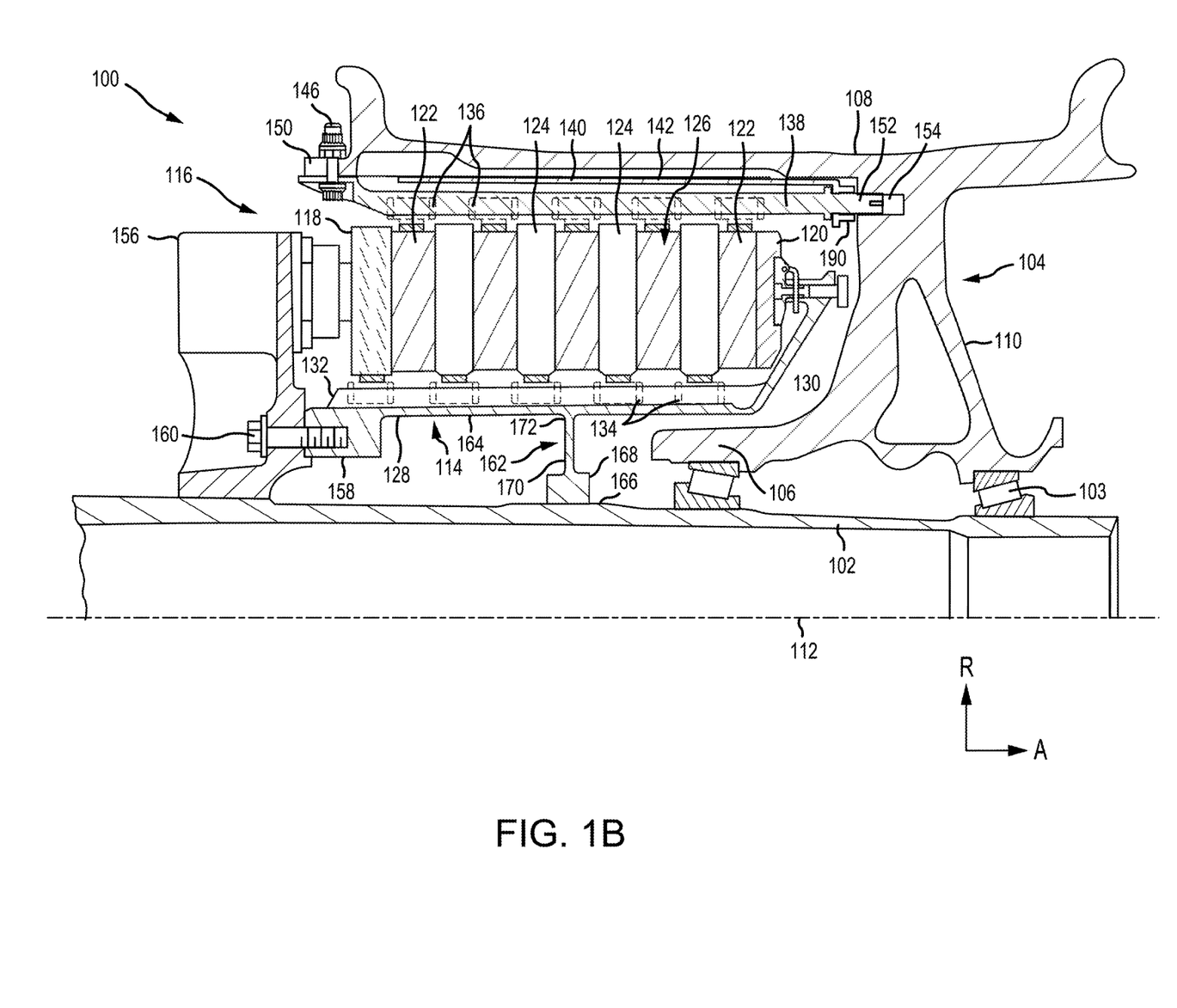
FIG. 1B illustrates a cross-sectional view of a wheel and brake assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Each brake assembly, including the torque plate barrel 114, is designed for a specific application and modes of operation. The size (e.g., length, diameter, thickness, etc.) and material of the torque plate barrel 114 may be modified to suit a particular application or improve a mode of operation. Different modes of operation that are considered include whirl, squeal, and disc squeal, just to name a few. Additional design considerations include dynamic stability, such as torsional compliance, axial compliance, and structural asymmetry, and cooling of the brake assembly, including the torque plate barrel 114.

Figure 2A:
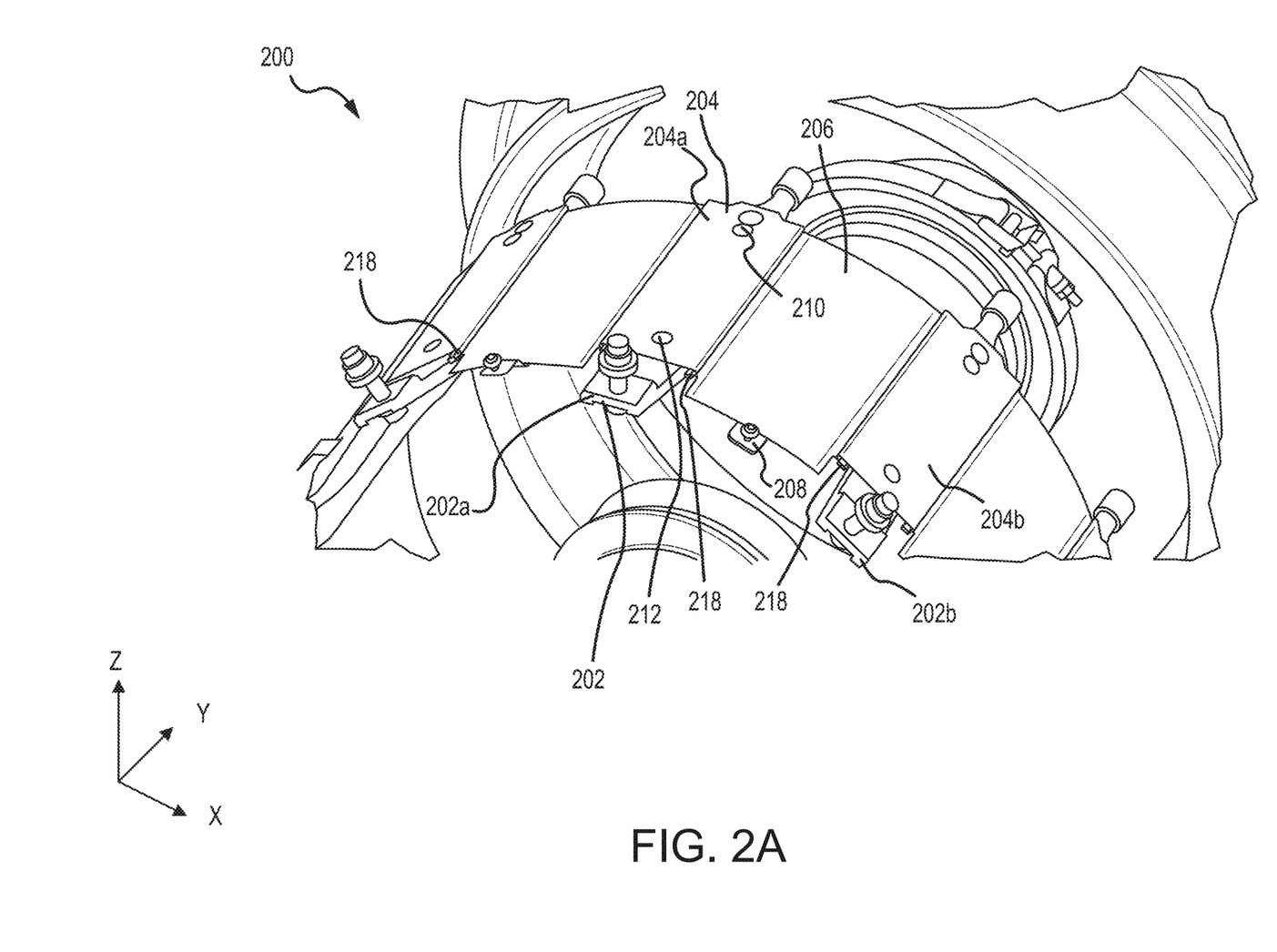
FIGS. 2A, 2B, 2C, and 2D illustrate a heat shield retention clasp, in accordance with various embodiments.

Referring now to FIGS. 2A-2D, in accordance with various embodiments, a heat shield 200 is illustrated. Heat shield 200 includes one or more torque bars 202, one or more retainers 204, one or more heat shield panels 206, and one or more fasteners 208. Torque bar 202 may be an example of torque bar 138 described above with respect to FIG. 1B. Retainer 204 and heat shield panel 206 may be part of heat shield 140 described above with respect to FIG. 1B. In various embodiments, each retainer 204 may be secured to a respective torque bar 202 and each side of heat shield panel 206 may be secured to different retainers. For example, as illustrated in FIG. 2A, a retainer 204a may be secured to a torque bar 202a, a retainer 204b may be secured to a torque bar 202b, and a heat shield panel 206 may be connected to retainer 204a on one side and to retainer 204b on another side. Fastener 208 secures heat shield panel 206 in place, preventing longitudinal movement (e.g., the y-direction) of heat shield panel 206.

Figure 2B:
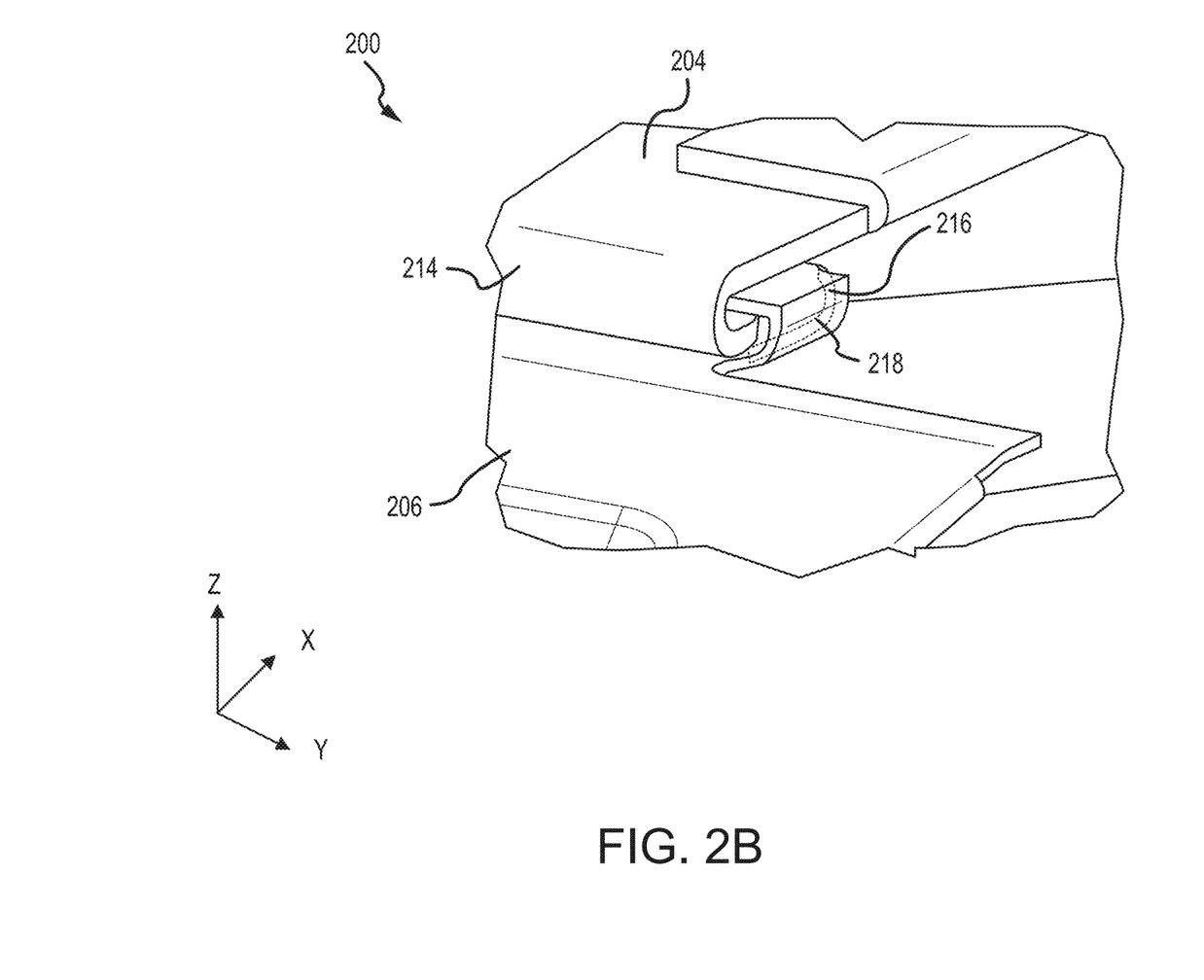
Figure 2C:
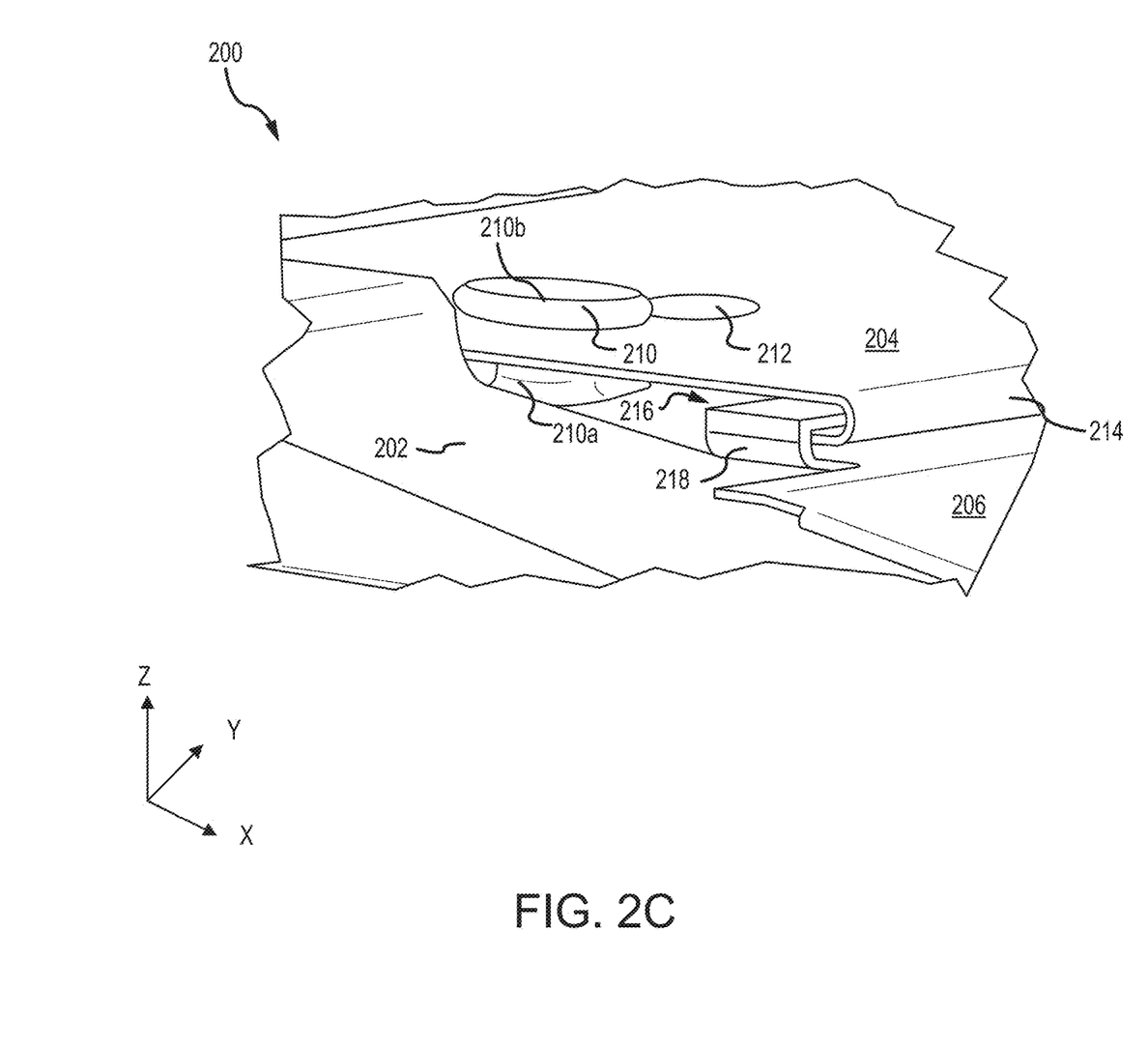
Figure 2D:
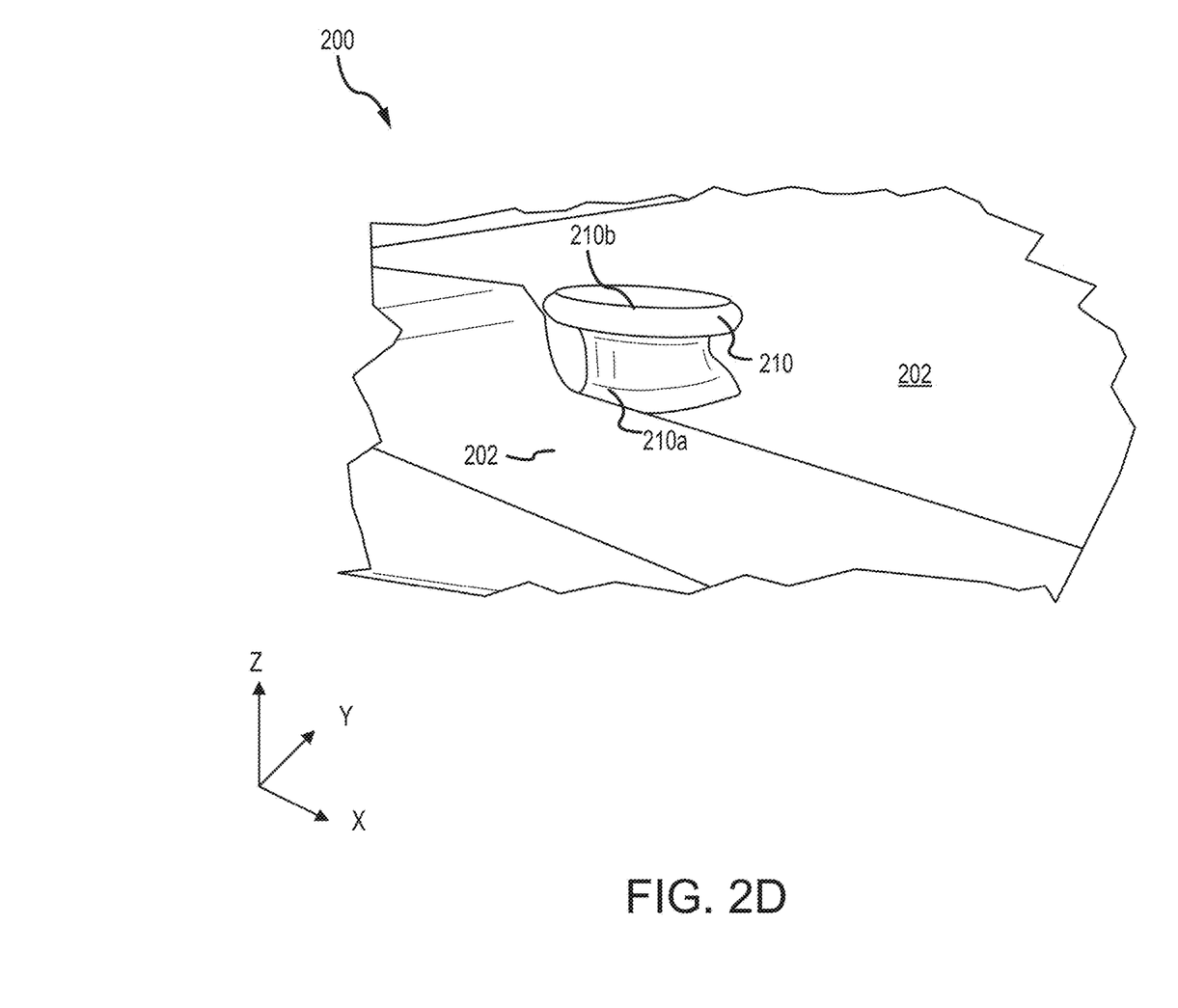

As best seen in FIG. 2D, each torque bar 202 includes one or more mushroom features 210 extending orthogonally (e.g., the z-direction) from torque bar 202. Mushroom feature 210 has an upright portion 210a that is connected to a top portion 210b. Top portion 210b is wider than upright portion 210a. With reference to FIG. 2C, each retainer 204 includes one or more retention slots 212 configured to secure retainer 204 to torque bar 202 using mushroom feature 210. Retention slot 212 may formed as an elongated hole along a length of retainer 204 (e.g., the y-direction). In various embodiments, retention slot 212 may have a larger diameter opening at a first end that is configured to allow mushroom feature 210, and more specifically top portion 210b, to fit through retention slot 212 and a smaller diameter opening at a second end that is configured to engage mushroom feature 210, and more specifically upright portion 210a, and secure retainer 204 to torque bar 202. This allows retainer 204 to be coupled to torque bar 202 placing retention slots 212 of retainer 204 over mushroom features 210 extending from torque bar 202. Retainer 204 then slides longitudinally (e.g., the y-direction) so that the narrow end of retention slots 212 engage mushroom features 210 (e.g., upright portion 210a), securing retainer 204 in place.

With reference to FIGS. 2B and 2C, retainer 204 includes a seam 214 along the longitudinal length (e.g., the y-direction) of retainer 204. Seam 214 is formed from retainer 204 being bent under retainer 204 (e.g., the negative z-direction) forming a U-shaped channel. A U-shaped channel, or U-fold, seam 214 of retainer 204 is formed on both longitudinal sides (e.g., the y-direction) of retainer 204 allowing retainer 204 to engage heat shield panel 206, and couple retainer 204 to heat shield panel 206. In various embodiments, seam 214 may be formed by bending the longitudinal edges of retainer 204 over retainer 204 (e.g., the positive z-direction).

Heat shield panel 206 includes complementary seams 216 along the longitudinal sides (e.g., the y-direction) of heat shield panel 206 in the opposite direction of seams 214. In various embodiments, seams 216 are folded over heat shield panel 206 (e.g., the z-direction) forming a U-shaped channel. A U-shaped channel, or U-fold, seam 216 of heat shield panel 206 is formed along both longitudinal sides (e.g., the y-direction) of heat shield panel 206. In various embodiments, seams 216 are folded under heat shield panel 206 (e.g., the negative z-direction). By forming seams 216 in the opposite direction of seams 214, retainer 204 and heat shield panel 206 may be coupled together by sliding seam 216 (e.g., the U-channel) into and through seam 214 (e.g., the U-channel). That is, seam 214 and seam 216 interlock to secure retainer 204 to heat shield panel 206, preventing migration of retainer 204.

Heat shield panel 206 further includes a retention clasp 218 that is formed, and located, adjacent seam 216. Retention clasp 218 may be integral with heat shield panel 206 adjacent seam 216 that is folded over and onto seam 214 (e.g., the z-direction). Retention clasp 218 may provide an end cap to seam 216 (e.g., U-channel) to prevent retainer 204, and more specifically, seam 214 from sliding past heat shield panel 206. In other words, retention clasp 218 limits the freedom of movement of retainer 204, working with mushroom features 210 to secure retainer 204 to torque bar 202 and keep heat shield 200 in the correct position. In various embodiments, retention clasp 218 may be welded to seam 216.

In various embodiments, seam 216 may not extend the entire longitudinal length of heat shield panel 206. In various embodiments, retention clasp 218 may not be integral with heat shield panel 206 and may be a separate piece that is secured to heat shield panel 206, and more specifically, to seam 216, such as for example, by welding.

Figure 3:
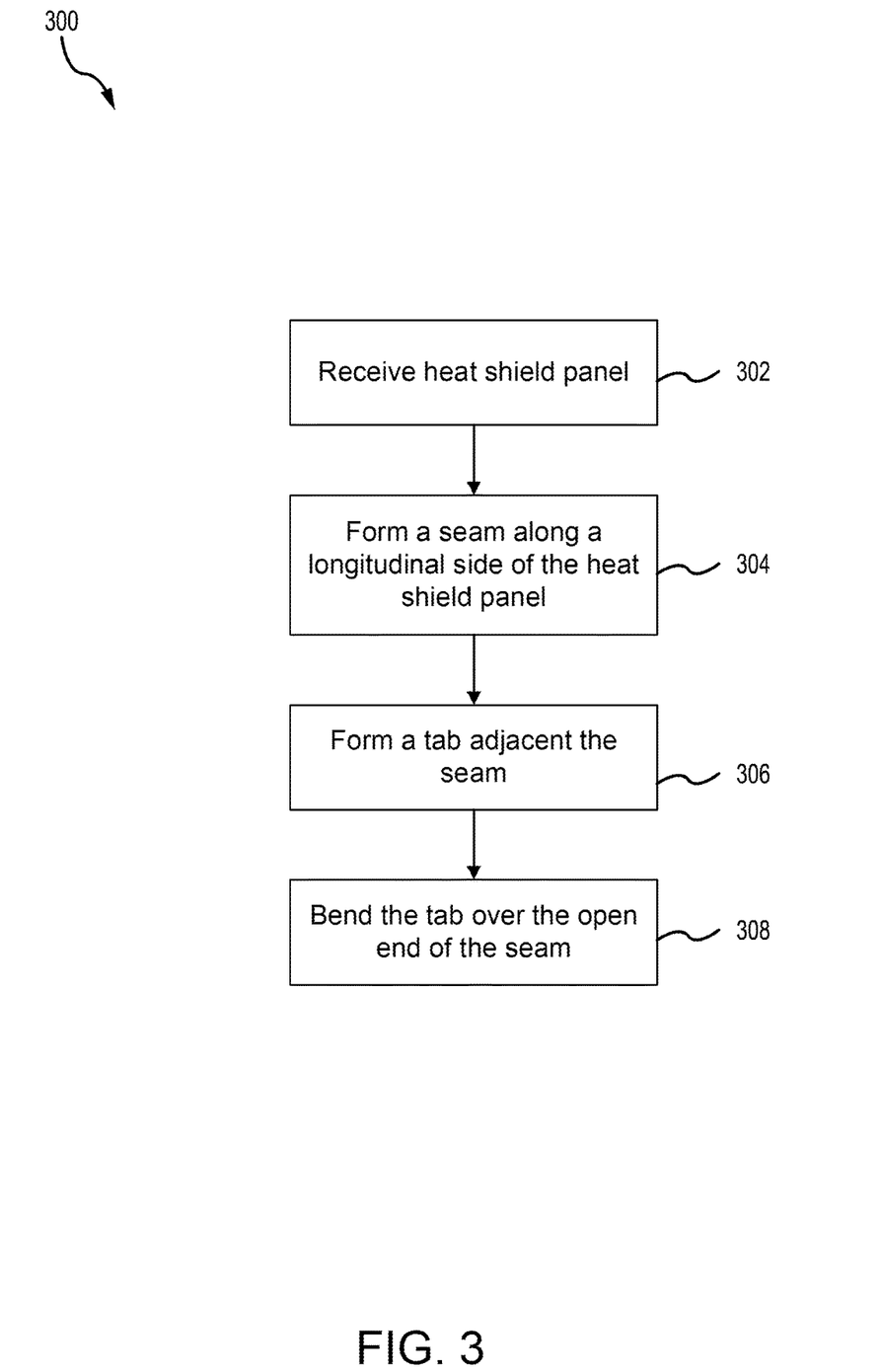
FIG. 3 illustrates a flow diagram of a method of manufacture of a heat shield panel including a retention clasp, in accordance with various embodiments.

Referring now to FIG. 3, in accordance with various embodiments, a method 300 of manufacturing heat shield 200, and more specifically, heat shield panel 206 is illustrated. At block 302, a heat shield panel is received. The heat shield panel may be an example of heat shield panel 206 described above with respect to FIGS. 2A-2C. At block 304, a seam is formed along a longitudinal side of the heat shield panel, extending in a first direction. The seam may be formed by folding the longitudinal side of the heat shield in a second direction that is perpendicular the first direction and back over the heat shield panel forming a U-shaped channel. At block 306, a tab is formed from the heat shield panel adjacent the seam. At block 308, the tab is bent over an open end of the seam. In various embodiments, the tab may be secured to the open end of the seam.

In various embodiments, a second seam may be formed on an opposite side of the heat shield panel. In various embodiments, a retainer plate is received and a seam is formed along a longitudinal side of the retainer plate. In various embodiments, the seam formed on the retainer plate is formed in an opposite direction of the seam formed on the heat shield panel, as described above, forming complementary seams. In various embodiments, the complementary seams are coupled together to prevent the migration of the retention plate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A wheel assembly, comprising:
   a torque bar extending in a first direction;
   a retainer plate coupled to the torque bar, the retainer plate having a first seam along a longitudinal length of the retainer plate formed by a first side of the retainer plate being bent into a first U-channel, the first U-channel formed in a second direction perpendicular to the first direction;
   a heat shield panel having a second seam along a longitudinal length of the heat shield panel formed by a first side of the heat shield panel being bent into a second U-channel, the second U-channel of the heat shield panel being formed in a third direction opposite the second direction; and
   a retention clasp formed from a portion of the heat shield panel, the retention clasp formed over and onto an open end of the second U-channel in a fourth direction opposite the first direction to provide a U-channel end cap to the second seam to prevent the first seam from sliding past the heat shield panel.

2. The wheel assembly of claim 1, further comprising:
a mushroom feature extending orthogonally from the torque bar in the fifth direction, the mushroom feature extending through a retention slot formed in the retainer plate.

3. The wheel assembly of claim 1, wherein the retention clasp is secured to the open end of the second U-channel.

4. The wheel assembly of claim 1, wherein a portion of the first U-channel of the retainer plate is interlocked with the second U-channel.

5. The wheel assembly of claim 1, further comprising:
a fastener configured to prevent the heat shield panel from moving in the first direction.

6. The wheel assembly of claim 1, wherein the retention clasp is formed adjacent the open end of the second U-channel.

7. The wheel assembly of claim 1, further comprising:
a second retention clasp formed from a second portion of the heat shield panel, the second retention clasp formed over and onto a second open end of the second U-channel to provide a second U-channel end cap to the second seam to prevent the first seam from sliding past the heat shield panel.

8. A heat shield assembly, comprising:
a retainer having a first side, the retainer having a first seam along a longitudinal length of the retainer formed therein by the first side of the retainer being bent into a first U-channel, the first U-channel formed in a first direction;
a heat shield panel having a first side, the heat shield panel having a second seam along a longitudinal length of the heat shield panel formed therein by the first side of the heat shield panel being bent into a second U-channel, the second U-channel of the heat shield panel being formed in a second direction opposite the first direction, the second seam being complementary the first seam, the heat shield panel being coupled to the retainer by the first seam and the second seam; and
a retention clasp formed over and onto an open end of the second seam in a third direction perpendicular the first direction and the second direction to provide a U-channel end cap to the second seam to prevent the first seam from sliding past the heat shield panel.

9. The heat shield assembly of claim 8, wherein the retention clasp is secured to the open end of the second seam.

10. The heat shield assembly of claim 8, wherein a portion of the first seam is interlocked with the second seam.

11. The heat shield assembly of claim 8, further comprising:
a second retention clasp formed over and onto a second end of the second seam, the second end being opposite the open end of the second seam to provide a second U-channel end cap to the second seam to prevent the first seam from sliding past the heat shield panel.

12. The heat shield assembly of claim 8, wherein the retention clasp is integral with the heat shield panel.

13. The heat shield assembly of claim 8, wherein the retainer further includes retention slots formed therein.

14. The heat shield assembly of claim 8, wherein the first seam is formed as a U-channel having an open channel along a length of the first seam.

15. A method of manufacturing a heat shield, comprising;
receiving a heat shield panel;
forming a seam in a first direction along a longitudinal length of the heat shield panel by bending a first side of the heat shield panel into a first U-channel, the seam including an opening along a short edge of the seam extending in a second direction that is perpendicular to the first direction;
forming a tab adjacent the short edge of the seam; and
bending the tab over and onto the opening of the short edge of the seam in a third direction perpendicular the first direction.

16. The method of claim 15, further comprising:
receiving a retainer plate;
forming a second seam in a fourth direction along a longitudinal length of the retainer plate by bending a first side of the retainer plate into a second U-channel, the fourth direction being opposite the first direction; and
coupling the second seam of the retainer plate to the seam of the heat shield panel.

17. The method of claim 16, further comprising:
forming a retention slot in the retainer plate;
receiving a torque bar extending in the second direction, the torque bar including a mushroom feature extending orthogonally from the torque bar in the first direction; and
connecting the retainer plate to the torque bar, wherein the mushroom feature extends through the retention slot.

18. The method of claim 17, further comprising:
sliding the retainer plate in the second direction, securing the retainer plate to the torque bar.

19. The method of claim 18, wherein the tab contacts the second seam of the retainer plate in response to the heat shield panel being coupled to the retainer plate.

20. The method of claim 15, further comprising securing the tab to the short edge of the seam.

* * * * *